US012654947B2

(12) United States Patent
Bynum

(10) Patent No.: US 12,654,947 B2
(45) Date of Patent: Jun. 16, 2026

(54) CONVEYOR BOOM ASSEMBLY HAVING REVERSING DISTAL SECTION

(71) Applicant: Walter Bynum, Palm City, FL (US)

(72) Inventor: Walter Bynum, Palm City, FL (US)

( * ) Notice: Subject to any disclaimer, the term of this patent is extended or adjusted under 35 U.S.C. 154(b) by 0 days.

(21) Appl. No.: 19/206,491

(22) Filed: May 13, 2025

(65) Prior Publication Data

US 2025/0313410 A1 Oct. 9, 2025

Related U.S. Application Data

(63) Continuation of application No. 18/382,335, filed on Oct. 20, 2023, now Pat. No. 12,297,047.

(51) Int. Cl.
| | |
|---|---|
| *B65G 15/26* | (2006.01) |
| *B65G 11/02* | (2006.01) |
| *B65G 21/12* | (2006.01) |
| *B65G 21/14* | (2006.01) |
| *B65G 41/00* | (2006.01) |

(52) U.S. Cl.
CPC ............. *B65G 15/26* (2013.01); *B65G 21/12* (2013.01); *B65G 21/14* (2013.01); *B65G 41/002* (2013.01); *B65G 41/008* (2013.01); *B65G 11/026* (2013.01)

(58) Field of Classification Search
None
See application file for complete search history.

(56) References Cited

U.S. PATENT DOCUMENTS

| | | | | |
|---|---|---|---|---|
| 4,186,161 | A * | 1/1980 | Ulmschneider | ......... B29C 45/06 |
| | | | | 264/161 |
| 4,944,364 | A * | 7/1990 | Blasko | .................. B66F 11/044 |
| | | | | 212/300 |
| 5,016,731 | A * | 5/1991 | Holmes | ................. B66F 11/044 |
| | | | | 254/228 |
| 5,176,485 | A * | 1/1993 | Ruder | .................... B65G 67/08 |
| | | | | 414/688 |
| 6,155,400 | A | 12/2000 | Daigh et al. | |
| 7,108,125 | B2 * | 9/2006 | Gilmore | .................. A61L 31/16 |
| | | | | 198/313 |
| 10,906,744 | B2 | 2/2021 | Grose et al. | |
| 11,187,001 | B1 * | 11/2021 | Bynum | .................. B65G 47/44 |
| 11,389,351 | B2 * | 7/2022 | Couture | ................. A61G 5/128 |
| 2023/0126101 | A1 | 4/2023 | Ligman et al. | |

* cited by examiner

*Primary Examiner* — Kavel Singh
(74) *Attorney, Agent, or Firm* — The Concept Law Group, PA; Scott D. Smiley; Scott M. Garrett

(57) ABSTRACT

A conveyor boom assembly includes a main boom section and a distal boom section that is coupled to the distal end of the main boom section. Both the main boom section and distal boom sections have conveyor belts to move material along the respective boom section. The distal boom section is moveable in a direction to extend forward of the main boom section, and it can also be moved to retract under the main boom section. Further, the conveyor belt of the distal boom section can be selectively driven in either direction, forward or reverse.

13 Claims, 6 Drawing Sheets

100

CONVEYOR BOOM ASSEMBLY HAVING REVERSING DISTAL SECTION

CROSS REFERENCE

This application is a continuation of U.S. patent application Ser. No. 18/382,335, filed Oct. 20, 2023, and issued as U.S. Pat. No. 12,297,047 on May 13, 2025, the entirety of which is incorporated by reference.

FIELD OF THE INVENTION

The present invention relates generally to mobile boom assemblies for the movement and/or placement of material at a work site, and, more particularly, relates to a boom assembly having a distal section where the distal section can be extended from the main boom section, withdrawn under the main boom section, and the conveyor belt of the distal boom section can be operated in both directions.

BACKGROUND OF THE INVENTION

There are a variety of applications where material needs to be conveyed from one location to another, and conveyor belt systems are commonly used to do so. In construction operations, as an example, it is common for construction material to be transported and delivered to a construction site, and the material must be moved from a delivery location to another location on the construction site. The same is true in other industries, such as agriculture, mining, and other industries where material must be moved from a delivery location to another location where the material is stored, refined, or otherwise utilized. In construction it is common, for example, to have truckloads or concrete mix delivered to a site that then needs to be moved to another location, which can include a placement location (i.e. the final location where the concrete will cure).

In order to move material at such locations, it is common to use a mobile system that can receive the material and move it to a desired location. For example, a boom system mounted on a truck or similar heavy vehicle can be driven to a location, and the boom/conveyor deployed. Material can be fed to the conveyor system at the truck and then conveyed along the boom system to delivery or placement location. A boom system can extend outward from the mounting point (e.g. at the vehicle), moving the end of the boom system to a particular location to deliver material at that location. To move the boom system to deliver material to another location the entire boom may have to be rotated/turned at the mounting point, and the boom system may have to be extended or retracted. Operating the entire boom system for a relatively small change in delivery location can be time consuming. To allow finer and faster control over changing delivery location it has been contemplated to add a distal boom section at the end of a main boom assembly that can rotate around the end of the main boom section. However, despite providing finer control at the end of the main boom section for delivery of conveyed material, the main boom section must still be adjusted in many cases to get the material delivered to a desired location.

Therefore, a need exists to overcome the problems with the prior art as discussed above.

SUMMARY OF THE INVENTION

In accordance with some embodiments of the inventive disclosure, there is provided a conveyor boom assembly that includes a main boom section having a distal end, and a mounting point adjacent a proximate end of the main boom section. The proximate end is opposite the distal end along the length of the main boom section. There is a main conveyor belt that moves along and traverses the length of the main boom section to move material from a feed point near the proximate end to the distal end, where the material fall off the main boom section. There is a mount in which the main boom section is mounted at a mounting point, and the mount being capable of horizontal rotation to allow positioning of the main boom section about the mount. There is a coupling mounted at the distal end of the main boom section, and a distal boom section mounted to the coupling. The distal boom section is positioned under the distal end of the main boom section to receive material moved by the main conveyer belt to the distal end of the main boom section onto a distal conveyor belt of the distal boom section which traverses the distal boom section. The coupling is configured to selectively move the distal boom section relative to the distal end of the main boom section such that some portion of the distal conveyor belt is always positioned under the distal end of the main boom section to receive the material from the main conveyor belt regardless of the position of the distal boom section relative to the distal end of the main boom section.

In accordance with s further feature, the distal conveyor belt is selectively and alternatively operable to move in a forward direction and a reverse direction.

In accordance with s further feature, the distal boom section has first chute at the first end and a second chute at the second end.

In accordance with s further feature, the main boom section includes a fixed section that is coupled to the mount, and a telescoping section that extends from, and retracts into the fixed section.

In accordance with s further feature, there is further provided at least one intermediate boom section. that is telescopically coupled between the fixed section and the telescoping section.

In accordance with s further feature, the mount is located on a vehicle.

In accordance with some embodiments of the inventive disclosure, there is provided a mobile conveyor boom system which includes a vehicle having a rotatable mount disposed on the vehicle. There is a main boom section mounted in the rotatable mount. The main boom section has a proximal end adjacent the rotatable mount, and a distal end opposite the proximal end. There is a main conveyor belt that transits the main boom section between the proximal end and the distal end (and returns to the proximate end). There is a distal boom section that is coupled to the distal end of the main boom section by a coupler. The coupler holds the distal boom section and operates to move the distal boom section relative to the distal end of the main boom section to a selected position that is between one of an extended position where the distal boom section extends outward relative to the distal end of the main boom section, and a retracted position in which the distal boom section is mostly positioned under the main boom section at the distal end of the main boom section. The coupler, in moving the distal boom section, maintains some portion of a distal conveyor belt of the distal boom section under the distal end of the main boom section so that material conveyed by the main conveyor belt falls off the distal end of the main boom section and onto the distal conveyor belt.

In accordance with s further feature, the main conveyor belt transits between a feed point and the distal end of the main boom section, and wherein the distal conveyor belt that transits from a first end of the distal boom section to a second end of the distal boom section and is reversible so as to transit material on the distal conveyor belt in either direction between the first end and the second end of the distal boom section.

In accordance with s further feature, the distal boom section has first chute at a first end of the distal boom section and a second chute at a second end of the distal boom section.

In accordance with s further feature, the main boom section includes a fixed section that is coupled to the rotatable mount, and a telescoping section that extends from, and retracts into the fixed section.

In accordance with s further feature, there is further included at least one intermediate boom section. that is telescopically coupled between the fixed section and the telescoping section.

In accordance with s further feature, the vehicle is a truck.

In accordance with s further feature, the coupler comprises vertical support members including a forward vertical support members and rearward vertical support members.

In accordance with s further feature, the coupler further comprises rocker/roller assemblies mounted on the vertical support members, each of the rocker/roller assemblies of an upper set of the rocker/roller assemblies having a pair of rollers that are in contact with a top horizontal support member of the distal boom section, and each of the rocker/roller assemblies of a lower set of the rocker/roller assemblies having a pair of roller that are in contact with a bottom horizontal support member of the distal boom section.

In accordance with some embodiments of the inventive disclosure, there is provided a method of operating a conveyor boom assembly that includes providing a main boom section on a rotatable mount at a mounting point of the main boom section. The main boom section has a proximate end adjacent the mounting point and a distal end opposite the proximate end. The main boom section has a main conveyor belt operable to move material from the proximate end to the distal end of the main boom section where the material falls off the main boom section. The method also includes providing a distal boom section that is coupled to the distal end of the main boom section and held under the distal end of the main boom section such that some portion of a distal conveyor belt of the distal boom section is positioned under the distal end of the main boom section to receive material from the main conveyor belt onto the distal conveyor belt. A coupling that couples the distal boom section to the distal end of the main boom section is operable to selectively and alternatively extend and retract the distal boom section under the distal end of the main boom section while maintaining an alignment of the distal conveyor belt under the distal end of the main boom section. The method further includes positioning the main boom section to a desired position by rotating the rotatable mount, and positioning the distal boom section relative to the distal end of the main boom section so that material conveyed to the distal boom section falls off the distal boom section at a desired delivery point. The method thus further includes conveying material from a feed point at the main conveyor belt to the distal end of the main boom section, and receiving, onto the distal conveyor belt, from the main conveyor belt, under the distal end of the main boom section, the material. The method further includes conveying the material on the distal conveyor belt to, selectively, a first end of the distal boom section or a second end of the distal boom section. The distal conveyor belt is reversible to allow the material received on the distal conveyor belt to be moved to either end of the distal boom section, as selected.

Although the invention is illustrated and described herein as embodied in a boom assembly for conveying material that has a selectively extendable/retractable distal boom section, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

"In the description of the embodiments of the present invention, unless otherwise specified, azimuth or positional relationships indicated by terms such as "up", "down", "left", "right", "inside", "outside", "front", "back", "head", "tail" and so on, are azimuth or positional relationships based on the drawings, which are only to facilitate description of the embodiments of the present invention and simplify the description, but not to indicate or imply that the devices or components must have a specific azimuth, or be constructed or operated in the specific azimuth, which thus cannot be understood as a limitation to the embodiments of the present invention. Furthermore, terms such as "first", "second", "third" and so on are only used for descriptive purposes, and cannot be construed as indicating or implying relative importance.

In the description of the embodiments of the present invention, it should be noted that, unless otherwise clearly defined and limited, terms such as "installed", "coupled", "connected" should be broadly interpreted, for example, it may be fixedly connected, or may be detachably connected, or integrally connected; it may be mechanically connected, or may be electrically connected; it may be directly connected, or may be indirectly connected via an intermediate medium. As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the article being referenced. Those skilled in the art can understand the specific meanings of the above-mentioned terms in the embodiments of the present invention according to the specific circumstances.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
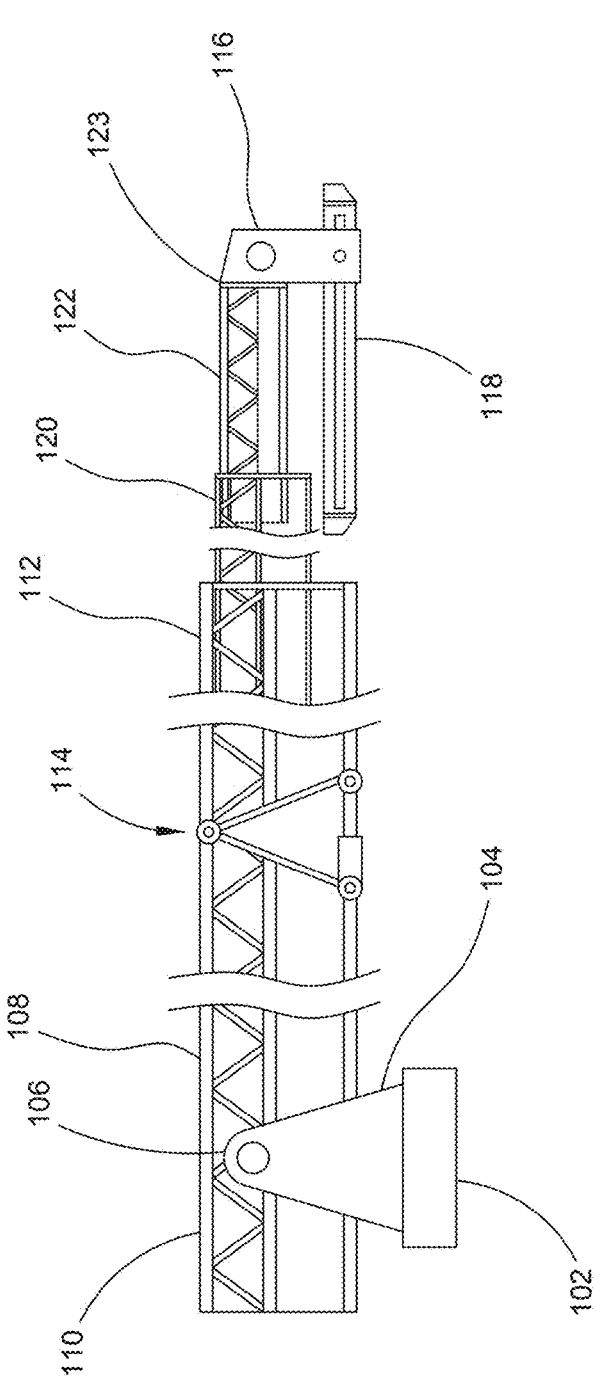
FIG. 1 shows a side view of a conveyor boom system having a reversing distal boom section in a retracted configuration, in accordance with some embodiments

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient boom system for material placement. Embodiments of the invention provide a main boom assembly that supports a distal boom assembly. Both the main boom assembly and the distal boom assembly support a main conveyor and a distal conveyor, respectively. The distal boom assembly is disposed under, and at the distal end of the main boom assembly, and is moveable forward and rearward under the main boom assembly. Further, the distal conveyor belt is operable to be selectively run in a forward or rearward direction, as desired by the boom system operator.

FIG. 1 shows a side view of a conveyor boom system 100 having a reversing distal boom section 118, shown here in a retracted configuration, in accordance with some embodiments. In general, the boom assembly is used to move material from a feed point of the boom assembly to the end of the boom assembly which is positioned over either a placement location or some other material conveyance system to further move the material. To move the material the boom assembly uses conveyor belts. There is one conveyor belt (a main conveyor belt) in a main boom section 108, and there is a distal conveyor belt on the distal boom section 118. Thus, material is deposited onto the main conveyor belt, such as through a feeder hopper, at a feed point, and the main conveyor belt, which transits the main boom section 108, moves the material to the distal end 123 of the main boom section 108. The material then falls off the main boom section 108 onto the distal boom section 118. The material is them moved by the distal conveyor belt to one of the two ends of the distal boom section, depending on which direction the distal conveyor belt is moving. The material can be any kind of bulk material suitable for being moved by a conveyor system. Examples of materials include construction material such as concrete, mined ore or other excavated material, grains and other agricultural products, scrap material, and so on.

The boom assembly 100 is shown on a rotatable mount comprising a rotatable base 102 and a coupling structure 104 that attaches to the main boom section 108 about a pivot point 106. The rotatable mount is capable of rotating in the horizontal plane or direction. The main boom section 108 is an elongated structure that is attached to the mount coupling 104 adjacent the proximal end 110 of the main boom section 108. The distal end 123 is at the opposite end of the main boom section 108 from the proximal end 110. The rotatable base can rotate the boom assembly in a horizontal plane, and the main boom section 108 can incline and decline about the pivot point 106 to control elevation of the distal end 123 of the main boom section 108. In addition, the main boom section can include a hinge 114 that allows declination of the portion of the main boom section beyond the hinge 114 relative to the portion of the main boom section coupled to the rotatable base 102. The hinge 114 can allow declination only when the telescoping sections of the main boom section are extended, and will not interfere with declination. By declining the extended boom section(s), the majority of the boom assembly can be substantially horizontal to reach a remote placement or transfer location where the conveyed material is either placed or transferred to another mechanism/machine.

In some embodiments the main boom section 108 is a monolithic member, and in other embodiments the main boom section can include one or more extendible sections. In embodiments having one or more extendible sections, the sections can be arranged in a telescoping configuration where there is a first boom portion coupled to the mount, and at least one extendable boom section that withdraws into, and extends from the first boom portion. In FIG. 1, for example, there is a first boom portion coupled to the mount, an intermediate extendible boom portion 120, and a terminal extendible portion 122, which defines the distal end 123 of the main boom section 108.

Attached to the main boom section 108 at the distal end 123 is a coupling 116 that performs several functions. The coupling 116 can act to hold a chute that directs material falling off the distal end 123 of the main boom section 108 as the conveyor belt turns around an end pulley and returns to the proximal end 110 along a bottom of the main boom section 108. Secondly, the coupling 116 holds and supports the distal boom section 118. Thirdly, the coupling 116 can include motors or actuators to move the distal section 118 relative to the coupling 116 so that the distal section 118 can be extended outward relative to the distal end 123 of the main boom section 108 to a fully extended position, or retracted under the main boom section at the distal end 123. Further, a power transfer means can be routed from the main boom section 108 to the distal boom section 118 through the coupling 116 that can be used to move the distal boom section 118 (i.e. extend or retract), as well as to drive the distal conveyor belt. The power transfer means can be a hydraulic circuit, or an electrical circuit, or a combination of hydraulic and electric circuits. Alternatively, a mechanical transfer be used, such as a chain or belt.

Figure 2:
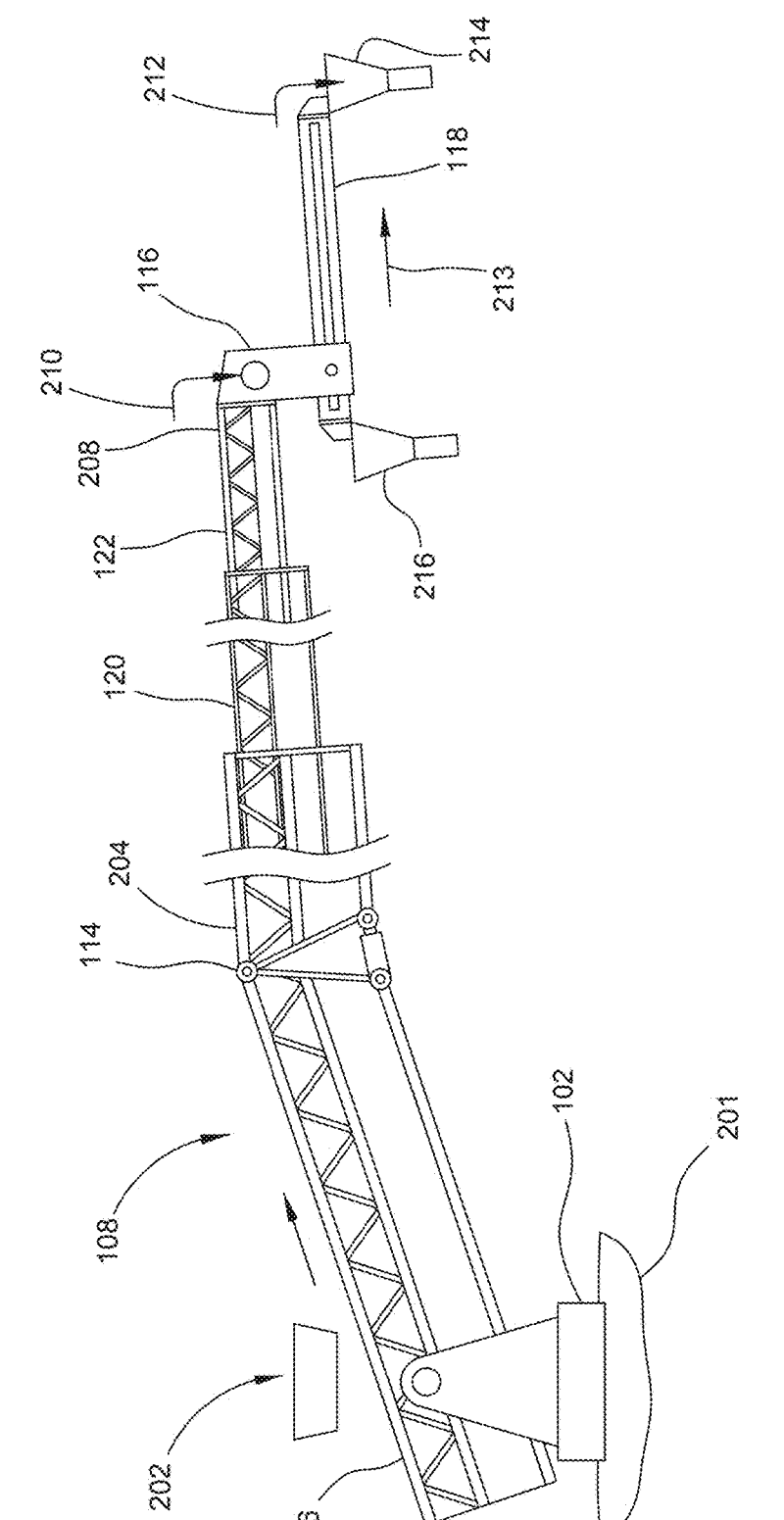
FIG. 2 shows a side view of a conveyor boom system having a revering distal section, with the boom system in an extended or deployed configuration, in accordance with some embodiments.

FIG. 2 shows a side view of a conveyor boom system 100 having a reversing distal boom section 118, with the boom system 100 in an extended or deployed configuration, in accordance with some embodiments. The conveyor boom system can be a mobile conveyor boom system with the mount base 102 mounted in a vehicle 210. The vehicle 201 can be a truck, a barge, a lift, a trailer, or any other mobile/moveable platform. In the embodiment shown here, the main boom section 108 is a first boom section that is coupled to the mount 102. A feed hopper 202 can be arranged over the top of the main boom section 108 near the proximate end or feed end, and material can be fed into the feed hopper 202 to control distribution of the material onto the main conveyor belt that transits across the top of the main boom section 108, an intermediate telescoping boom section 120, and a terminal telescoping boom section 122, which together make up the main boom assembly, and which are shown fully extended. The main or first boom section 108 has a hinge 114 that allows declination of a declination portion 204 of the main boom section 108 relative to a fixed boom portion of fixed section 206 that is coupled to the mount 102. The hinge 114 allows declination of the intermediate boom section 120 and the terminal boom section 122 to be approximately horizontal. As a result, the distal boom section 118 will likewise be horizontal.

The coupling 116 is mounted to the distal end of the main boom assembly, and in particular at the distal end 208 of the terminal boom section 122. Material fed through the feed hopper 202 is carried along the top of the main boom assembly to the distal end 208, where it falls, as indicated by arrow 210, on the distal conveyor belt on the top side of the distal boom section 118. In the embodiments represented here, the distal boom section has been extended forward, as indicated by arrow 213, and the distal conveyor belt is moving in the same direction as the main conveyor belt. Accordingly, the material transferred to the distal boom section 118 from the main conveyor belt will be traveling in the direction of arrow 212, and pass into chute 214 at a front end of the distal boom section 118, where it will fall through the chute 214 to either a placement location (e.g. its final place) or onto another conveyance (e.g. belt, vehicle, etc.). There is also a chute 216 at the second, or opposite end of the distal boom section, which is used when the distal conveyor belt is operated to transit the distal boom section 118 in the opposite direction (e.g. opposite of arrow 212). The coupling 116 is operable to retract the distal boom section 118 under the terminal boom section 122, which allows an effective range where the material being conveyed can be deposited of about twice the length of the distal boom section 118.

Figure 3:
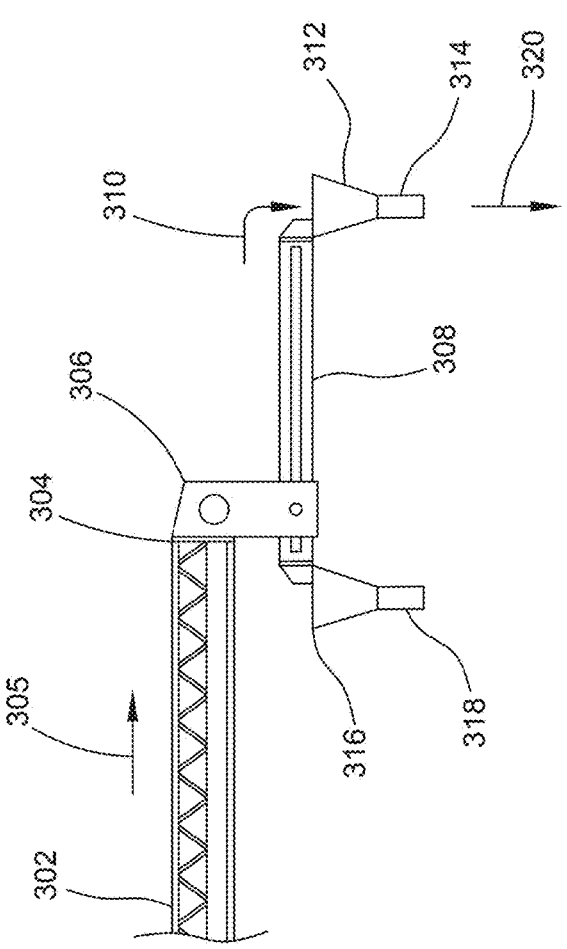
FIG. 3 shows a detail of the distal end of a main boom section and a distal boom section, in accordance with some embodiments.

FIG. 3 shows a detail 300 of the distal end 304 of a main boom section 302 and a distal boom section 308, in accordance with some embodiments. In the exemplary embodiment of FIG. 3, the main boom section 302 is a trussed boom section that can be either a single boom section or the terminal boom section of a telescoping boom assembly. A main conveyor belt transits along the top of the main boom section, moving in the direction of arrow 305, around a distal pulley at the distal end 304, and then returns back to the other end of the complete main boom section along the bottom of the main boom section 302. Material conveyed by the main conveyor belt then falls off at the distal end 304 and can be directed onto the distal conveyor belt on the distal boom section 308. A coupler 306 can be attached at the distal end 304 of the main boom section 302. The coupler 306 is further coupled to the distal boom section 308, and is operable to move the distal boom section forwards and backwards. That is, one or more actuators are mounted in the coupler 306 that move the distal boom section 308 while the coupler 306 also supports the distal boom section 308. This allows the distal boom section 308 to be extended outward relative to the main boom section 302, and retracted under the main boom section 302. In addition, control of the distal conveyor belt can also be accomplished through the coupler 306. For example, electrical lines to a motor in the distal boom section 308 can pass through the coupler 306. The distal conveyor belt can be driven in both directions around the distal boom section 308, which, when combined with the movement of the distal boom section 308, allows a range of about twice the length of the distal boom section 308 where material can be placed of otherwise delivered without the need to adjust or move the main boom section 302. In the embodiment shown, the distal conveyor belt is operated to move as indicated by arrow 310 so that material will fall into a first hopper 312 and through a chute 314 in the direction of arrow 320. The material can either be delivered to its final place, or to some other conveyance, vehicle, container, or other location. A second hopper 316 and chute 318 are provided at a second end of the distal boom section 308 for use when the distal conveyor belt is moved in the opposite direction of arrow 310.

Figure 4:
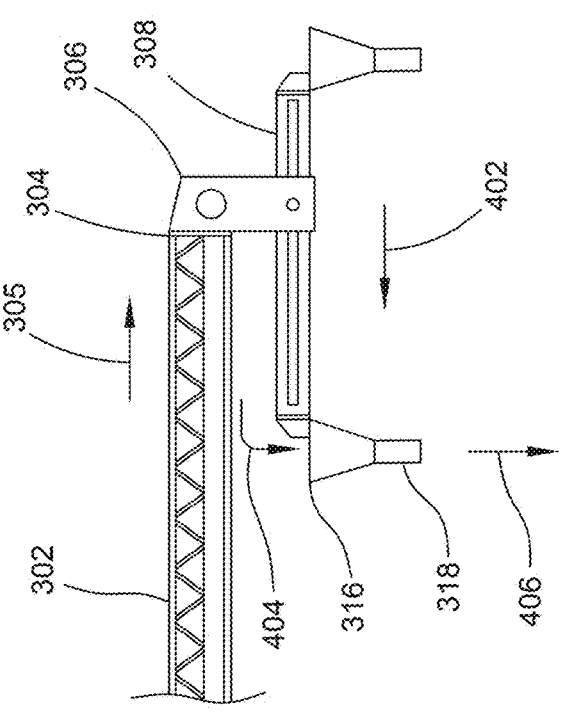
FIG. 4 shows a detail of the distal end of a main boom section and a distal boom section operating in reverse, in accordance with some embodiments.

In FIG. 4, the distal boom section 308 is moved in the direction of arrow 312 to retract the distal boom section 308 under the main boom section 302 as indicated by arrow 402. The distal conveyor belt is operated to move in the opposite direction of that shown in FIG. 3, as indicated by arrow 404. As a result, material conveyed, in the direction of arrow 305, by the main conveyor belt across the main boom section 302 will fall onto the distal conveyor belt and move in the opposite direction back under the main boom section, and into the second hopper 316 and through chute 318 in the direction of arrow 406.

Figure 5:
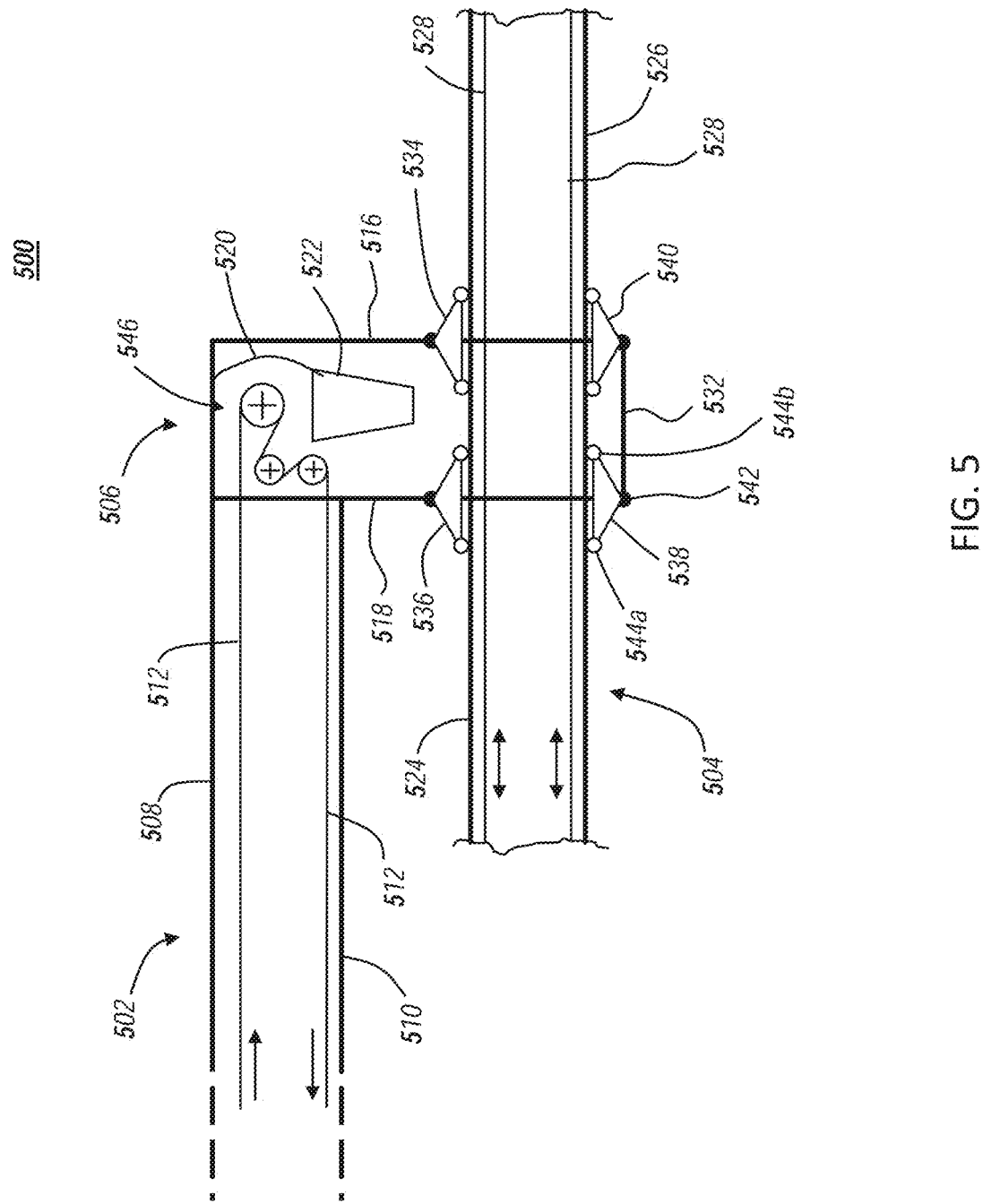
FIG. 5 shows a detail of a support arrangement for supporting a moveable distal boom section, in accordance with some embodiments.
Figure 6:
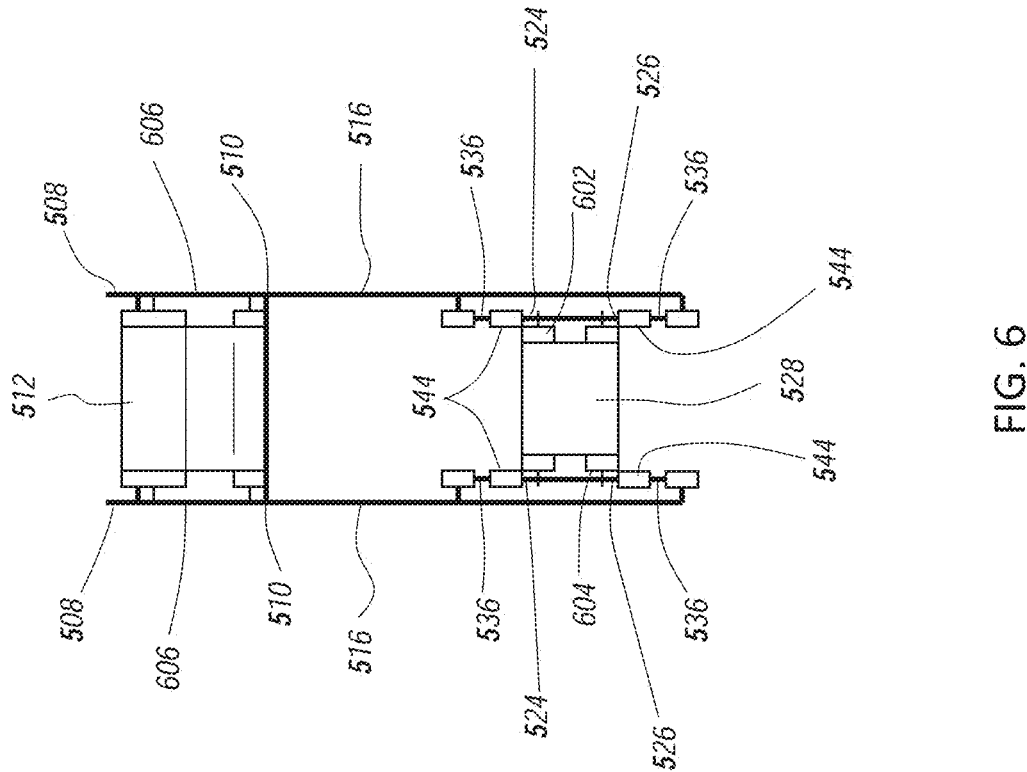
FIG. 6 shows an end view of the support arrangement for supporting the moveable distal boom section as shown in FIG. 5.

FIG. 5 shows a detail of a support arrangement 500 for supporting a moveable distal boom section, in accordance with some embodiments. FIG. 6 shows an end view of the support arrangement looking from the right side of the page in FIG. 5, without the diverter 520 or chute 522 present. A main boom assembly 502 supports a distal boom section 504 through a coupling section 506. The main boom assembly 502 includes a top support member 508 and a bottom support member 510. Side support members (606 in FIG. 6) join to both the top support member 508 and the bottom support member 510. A main conveyor belt 512 traverses in a forward direction along the top of the main boom section to a terminal pulley arrangement 546, and returns along the bottom of the main boom assembly. As material is moved by the main conveyor belt 512 it falls off the main conveyor belt 512 at the pulley arrangement 546, and is directed by a diverter member 520 into a chute 522, and then onto the distal conveyor belt 528. The distal boom section also includes a top horizontal support member 524 and a bottom horizontal support member 526. Again, side support members couple between the top and bottom support members 524, 526.

The coupling section 506 includes a pair of forward vertical support members 516 and a pair of rearward vertical support members 518 with one each of the forward and rearward vertical support members on each side of the boom sections. There are rocker/roller assemblies 534, 536, 538, and 540 attached to the vertical support member 516, 518. Rocker/roller assemblies 538, 540 are positioned in an inverted orientation relative to rocker/roller assemblies 534, 536. Each rocker/roller assembly includes an attachment point 542, and support brace member to which are attached, at opposite ends of the support brace member, rollers 544a, 544b. The rollers 544 can be driven to turn, such as by a motor. The rollers of rocker/roller assemblies 534, 536 are in contact with the top support member 524 of the distal boom section 504, and the rollers 544 of the lower, inverted rocker/roller assemblies 538, 540 are engaged with the lower support member 526 of the distal boom section 504. Thus, but driving the rollers 544 to turn, the distal boom section can be moved to extended forward or retract rearward. The distal boom section 504 has a distal conveyor belt 528 that is bi-directional. That is it can selectively be driving in either direction. If the distal conveyor belt is driven such that the portion of the distal conveyor belt along the top support member 524 moves in the forward direction, like that main conveyor belt 512, then material will move in a direction away from the boom assembly. If the distal conveyor belt 528 is driven in the opposite direction, then material will move in a direction toward the mount (e.g. 102). At the front end of the distal boom assembly, the distal conveyor belt 528 can be seen in FIG. 6 transiting over pulley 602, 604. The pulleys 602, 604 can be driven by, for example, an independent motor dedicated to the distal boom section 504, or it can be driven from the pulley arrangement 546 through a gearbox using chain or belt drive. The movement of the distal boom section 504, forward and rearward, can be achieved by driving rollers 544. The rollers can likewise be drive by independent motors, but can also be drive through the pulley arrangement 546 using, for example, a chain or belt linkage, and hydraulic pump, a rack & pinion drive, and so on, as are known. Controls for moving the distal boom section 504, and for controlling the direction of the distal conveyor belt 528 can be located near the mount 102 and/or at the terminal end of the main boom section to allow personnel at the terminal end of the main boom section to finely adjust the placement/delivery location of material.

Accordingly, the disclosed boom assembly provides the benefit of being able to adjust the placement or delivery location of material that is conveyed along the main boom assembly to locations forward or rearward of the end of the main boom section. This is accomplished by use of a distal boom section that is extendable and retractable, and which has a conveyor belt that can be driven forward or rearward, selectively. Movement of the distal section, and the direction of the distal conveyor belt, can be controlled by personnel at the end of the main boom section.

The claims appended hereto are meant to cover all modifications and changes within the scope and spirit of the present invention.

What is claimed is:

1. A conveyor boom assembly, comprising:
a main boom section having a distal end, and a mounting point adjacent a proximate end of the main boom section, the proximate end being opposite the distal end, a main conveyor belt traversing a length of the main boom section;
a mount in which the main boom section is mounted at a mounting point of the main boom section, the mount being capable of horizontal rotation;
a coupling mounted at the distal end of the main boom section;
a distal boom section mounted to the coupling and positioned under the distal end of the main boom section to receive material moved by the main conveyer belt to the distal end of the main boom section onto a distal conveyor belt of the distal boom section that traverses the distal boom section, wherein the distal conveyor belt is selectively and alternatively operable to move in a forward direction and a reverse direction independent of the main conveyor belt; and
wherein the coupling is configured to selectively move the distal boom section relative to the distal end of the main boom section such that the distal conveyor belt is positioned under the distal end of the main boom section to receive the material from the main conveyor belt regardless of a position of the distal boom section relative to the distal end of the main boom section, and wherein the coupling is operable to selectively and alternatively extend and retract the distal boom section relative to the coupling and the distal end of the main boom section during operation of the main boom section.

2. The conveyor boom assembly of claim 1, wherein the distal boom section has first chute at the first end and a second chute at the second end.

3. The conveyor boom assembly of claim 1, wherein the main boom section includes a fixed section that is coupled to the mount, and a telescoping section that extends from, and retracts into the fixed section.

4. The conveyor boom assembly of claim 3, further comprising at least one intermediate boom section that is telescopically coupled between the fixed section and the telescoping section.

5. The conveyor boom assembly of claim 1, wherein the mount is located on a vehicle.

6. A mobile conveyor boom system, comprising:
a vehicle;
a rotatable mount disposed on the vehicle;
a main boom section mounted in the rotatable mount, the main boom section having a proximal end adjacent the rotatable mount and a distal end opposite the proximal end, a main conveyor belt that transits the main boom section between the proximal end and the distal end; and
a distal boom section coupled to the distal end of the main boom section by a coupler which holds the distal boom section and operates to move the distal boom section relative to the coupler and the distal end of the main boom section to a selected position that is between one of an extended position where the distal boom section extends outward relative to the distal end of the main boom section, and a retracted position in which the distal boom section is positioned under the main boom section at the distal end of the main boom section, and wherein the coupler maintains a distal conveyor belt of the distal boom section under the distal end of the main boom section so that material conveyed by the main conveyor belt falls off the distal end of the main boom section and onto the distal conveyor belt, and wherein the coupler is operable to selectively and alternatively extend and retract the distal boom section relative to the coupler and the distal end of the main boom section during operation of the main boom section, and wherein the distal conveyor belt is operable to move, alternatively, in both a forward direction and a reverse direction independent of the main conveyor belt.

7. The mobile conveyor boom system of claim 6, wherein the distal boom section has first chute at a first end of the distal boom section and a second chute at a second end of the distal boom section.

8. The mobile conveyor boom system of claim 6, wherein the main boom section includes a fixed section that is coupled to the rotatable mount, and a telescoping section that extends from, and retracts into the fixed section.

9. The mobile conveyor boom system of claim 8, further comprising at least one intermediate boom section that is telescopically coupled between the fixed section and the telescoping section.

10. The mobile conveyor boom system of claim 6, wherein the vehicle is a truck.

11. The mobile conveyor boom system of claim 6, wherein the coupler comprises vertical support members including a forward vertical support members and rearward vertical support members.

12. The mobile conveyor boom system of claim 11, wherein the coupler further comprises rocker/roller assemblies mounted on the vertical support members, each of the rocker/roller assemblies of an upper set of the rocker/roller assemblies having a pair of rollers that are in contact with a top horizontal support member of the distal boom section, and each of the rocker/roller assemblies of a lower set of the rocker/roller assemblies having a pair of roller that are in contact with a bottom horizontal support member of the distal boom section.

13. A method of operating a conveyor boom assembly, comprising:

providing a main boom section on a rotatable mount at a mounting point of the main boom section, the main boom section having a proximate end adjacent the mounting point and a distal end opposite the proximate end, the main boom section having a main conveyor belt operable to move material from the proximate end to the distal end of the main boom section;

providing a distal boom section that is coupled to the distal end of the main boom section and held under the distal end of the main boom section such that a distal conveyor belt of the distal boom section is positioned under the distal end of the main boom section to receive material from the main conveyor belt onto the distal conveyor belt, wherein the distal conveyor belt is operable to move, alternatively, in both a forward direction and a reverse direction independent of the main conveyor belt, wherein a coupling that couples the distal boom section to the distal end of the main boom section is operable to selectively and alternatively extend and retract the distal boom section relative to the coupling under the distal end of the main boom section during operation of the main boom section while maintaining an alignment of the distal conveyor belt under the distal end of the main boom section;

positioning the main boom section to a desired position by rotating the rotatable mount;

positioning the distal boom section relative to the distal end of the main boom section;

conveying material from a feed point at the main conveyor belt to the distal end of the main boom section;

receiving, onto the distal conveyor belt, from the main conveyor belt, under the distal end of the main boom section, the material; and conveying the material on the distal conveyor belt to, selectively, a first end of the distal boom section or a second end of the distal boom section by operating the distal conveyor belt in either the forward direction or the reverse direction, respectively.

* * * * *